United States Patent [19]  
Nakazawa et al.

[11] Patent Number: 4,578,592  
[45] Date of Patent: Mar. 25, 1986

[54] STEERING WHEEL ASSEMBLY WITH CENTRALIZED CONTROL SYSTEM

[75] Inventors: Takaaki Nakazawa, Toyota; Kenichi Kazaoka, Nagoya; Nobuo Okazaki, Konan; Kunihiko Nakashima, Green, all of Japan

[73] Assignees: Aisin Seiki Kabushiki Kaisha, Kariya; Toyoda Gosei Co., Ltd., Nishikasugai, both of Japan

[21] Appl. No.: 615,587

[22] Filed: May 31, 1984

[30] Foreign Application Priority Data

Jun. 4, 1983 [JP] Japan .................................. 58-100072

[51] Int. Cl.$^4$ ........................ H01H 9/00; H01H 25/00
[52] U.S. Cl. ............................... 307/10 R; 200/61.54; 200/61.57; 180/78
[58] Field of Search .................... 307/10 R, 10 LS, 9; 200/61, 54, 61.57, 61.56; 364/424; 180/78, 90; 361/393; 74/492, 498

[56] References Cited

U.S. PATENT DOCUMENTS 4,327,264 4/1982 Botz et al. ................... 200/61.54 X  
4,386,278 5/1983 Kawada et al. ....................... 307/9  
4,386,279 5/1983 Yoshimi et al. .................. 307/10 R  
4,421,960 12/1983 Arima et al. .................... 200/61.54

FOREIGN PATENT DOCUMENTS 2929047 6/1980 Fed. Rep. of Germany .  
8034702 12/1980 Fed. Rep. of Germany .  
3149507 12/1981 Fed. Rep. of Germany .  
2481657 4/1981 France .  
58-33547 2/1983 Japan .

OTHER PUBLICATIONS

Oct. 25, 1980 Autocar publication.

Primary Examiner—Harry E. Moose, Jr.  
Assistant Examiner—T. DeBoer  
Attorney, Agent, or Firm—Oblon, Fisher, Spivak, McClelland & Maier

[57] ABSTRACT

A steering wheel assembly with a centralized control system including terminal component such as an input and output member disposed in a center pad of the steering wheel. In this assembly; the terminal component and a computer for controlling said terminal component are disposed in a center pad of the steering wheel, the terminal component being mounted to the center pad in a selectively exchangeable manner. The terminal component may be formed as an exchangable cassette unit. The terminal component is also provided with a variety of switches and/or accessory equipment to thereby permit the same to be readily replaced with another cassette unit in accordance with driver's demands. Therefore, the improved steering wheel assembly of this invention is convenient and it can promptly and easily respond to the user's demands.

9 Claims, 6 Drawing Figures

STEERING WHEEL ASSEMBLY WITH CENTRALIZED CONTROL SYSTEM

BACKGROUND OF THE INVENTION

1. Field of the Invention

This invention relates to a steering wheel assembly with a centralized control system wherein input or output means, such as a variety of switches for display devices etc., are concentrated on a center pad of the steering wheel, and more particularly to a steering wheel assembly with a centralized control system wherein the input or output means are arranged as an input or output part of the assembly and the input or output part thereof is constructed to be selectively exchangeable as necessitated.

2. Description of the Prior Art

Conventional steering wheel equipment is disclosed in Japanese patent application (Published unexamined patent application No. 33547/1983). In this conventional equipment, a center pad is mounted on a steering shaft and a variety of switches are fixedly disposed on the aforesaid center pad, and these switches are also electrically connected to a variety of control devices disposed within the vehicle body, such as a horn, car radio, air-conditioner, automatic drive and the like, thereby to control these devices.

On the other hand, recently, a vehicle, particularly, an automobile has been required to have many electronic control devices therein and therefore, control switches for these devices and display for indicating conditions of these devices are also increased in the number thereof. Moreover, not only has the demand for this kind of car been widely increased but also the variety of needs of users have been increased. Further, in view of the convenience and the improvement of reliability of operation, signal input means such as switches or signal output means such as displayes have a tendency to be centralized at the center pad.

However, in the aforesaid conventional equipment in which the switches are fixedly disposed to the center pad, it is impossible to dispose of all the switches which can be expected to be necessary, because the center pad is very limited in its practical space. As a result, only a predetermined number of switches can be disposed at the center pad, namely, only devices corresponding to the number of limited switches can be controlled. Therefore, the conventional type of equipment has been impossible to easily respond to user's demands. Moreover, the control devices mounted on automobiles are also different in every kind of the automobiles so that an individual center pad has been required for every kind of the automobile. Thus, there have been many problems in the prior art.

SUMMARY OF THE INVENTION

Accordingly, one object of the present invention is to provide an improved steering wheel assembly with a centralized control system which has overcome the aforesaid problems.

Another object of the present invention is to provide improved steering wheel assembly with a centralized control system in which input means and output means are constructed to be selectively exchangeable.

Still another object of the present invention is to provide steering wheel assembly with an improved centralized control system which includes a cassette type switch unit as the input means of the assembly.

A further object of the present invention is to provide a steering wheel assembly with an improved centralized control system, which is convenient and reliable in operation thereof.

A still further object of the present invention is to provide steering wheel assembly with an improved centralized control system, which can promptly and easily respond to the user's demands.

These and other objects are achieved according to the present invention. The steering wheel assembly of the present invention has a center pad provided with a control device and a mechanical connector and at least one selectively exchangeable input or output means to be connected to said mechanical connector.

According to the present invention, it is possible for a driver to equip a variety of input and/or output parts of electric appliances in accordance with his demand and to replace the input and/or output part thereof with another prepared input and/or output part of other electric appliances according to necessity in use. Therefore, the steering wheel assembly of this invention is more convenient in the operation thereof and it can also improve the reliability of operating the switches and the like. Further, in case where kinds of switches are increased, the steering wheel equipment of this invention is possible to promptly and easily respond to such an increase of switches by replacing the input and or output part of the assembly with another prepared part. Also the steering wheel assembly of the present invention can be used over wide range from a popular car to a deluxe car.

A more complete appreciation of the invention and many of the attendant advantages thereof will be readily obtained as the same becomes better understood by reference to the following detailed description when considered in connection with the accompanying drawings, wherein:

DESCRIPTION OF THE PREFERRED EMBODIMENTS

Hereinafter, the present invention will be explained in more detail in accordance with a preferred assembly thereof with reference to the accompanying drawings.

Figure 1:
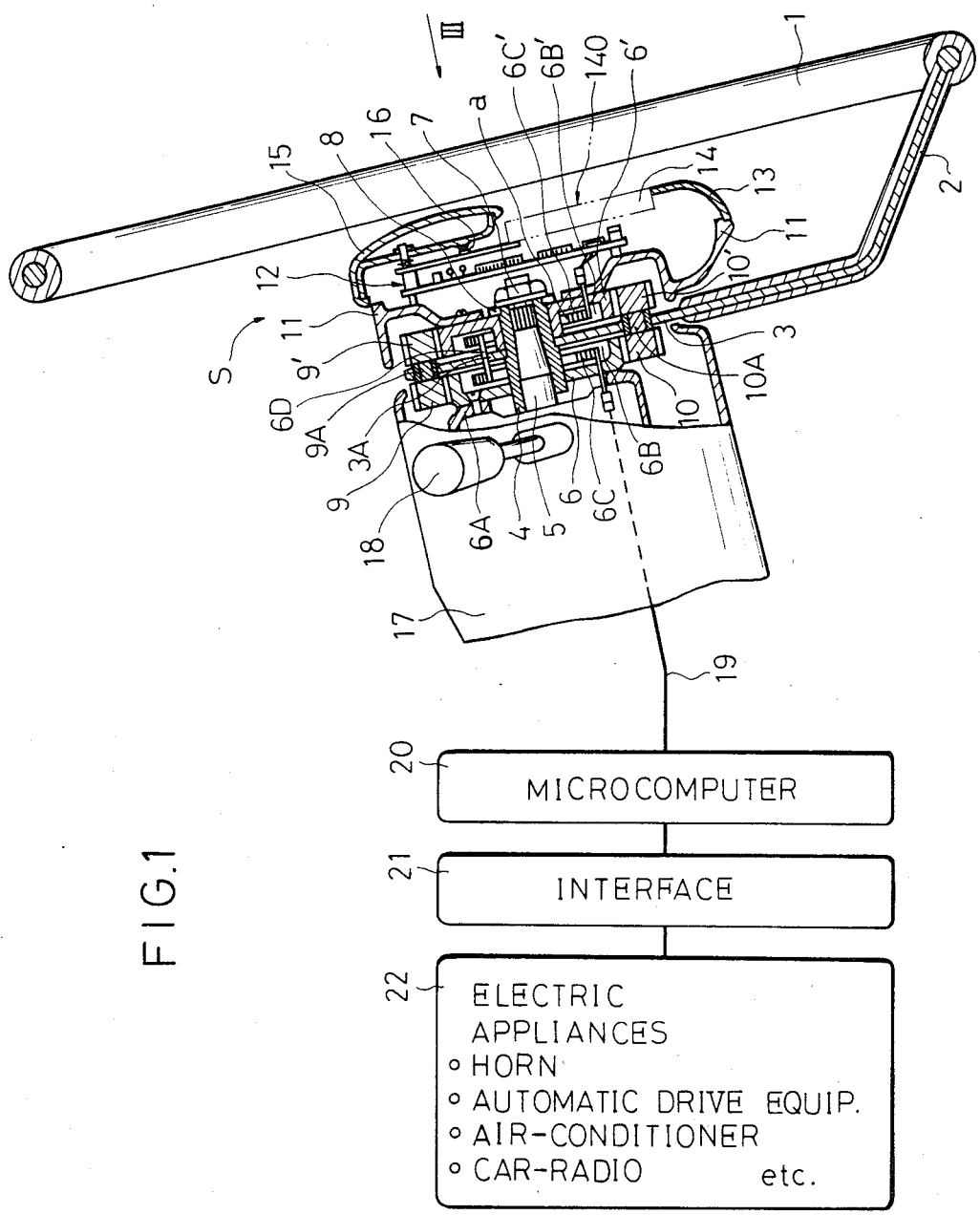
FIG. 1 is a partial sectional view of a steering wheel assembly S according to an embodiment of the present invention.

Referring now to FIG. 1, there is shown a steering wheel assembly S with a centralized control system of an embodiment according to the present invention. From one end of a circular steering wheel 1, a spoke 2 is extended in the direction of center thereof and a core bar 3 is inserted into the spoke 2. The core bar 3 is fixed to a steering shaft 5 with a collar member 4. The steering shaft 5 is connected to a steering gear at a lower portion (not shown) in the axial direction thereof. At the steering shaft 5, there is disposed a pair of ring gears 6, 6' so as to sandwich the aforesaid core bar 3 at both sides thereof and one gear 6 is fixed to a fixing member 6A which is fixed to the body and rotatably holds the steering shaft 5. The other gear 6' is rotatably mounted to the top end of the steering shaft 5 by means of a nut 7 and a snap ring 8 so as to permit the relative rotation thereof to the aforesaid collar member 4. Each of the ring gears 6, 6' is provided with gear tooth at the outer periphery thereof and pinions 9, 9' and 10, 10' are engaged with the aforesaid gear tooth. The pinions 9 and 9' are formed in one body with a connecting shaft 9A which is rotatably held by the aforesaid core bar 3. The other pinions 10 and 10' opposite to the pinions 9, 9' are also formed in one body and a connecting shaft 10A which is also rotatably holded by the core bar 3. Also each of the ring gears 6, 6' has a central chamber 6B, 6B' in which a spiral cable 6C, 6C' is held. The cables 6C, 6C' are connected with a connecting cable 6D which passes through a through hole 3A of the core bar 3.

To the side wall of the ring gear 6', there is fixed a pad body 11 by means of screws. To the pad body 11, there is also fixedly mounted a first microcomputer 12 as a controller of a transmitter. The microcomputer 12 is electrically connected with the cable 6C'. To a lower portion 13 of the pad body 11 there is exchangeably mounted a terminal component in the form of a switch unit 140 which will be described later in more detail. The switch unit 140 is provided with several switches 14 for a variety of devices 22, (for example, a car radio switch, an air-conditioner switch, an automatic drive switch and the like). As one of the aforesaid switches 14, a horn (klaxon) switch may be also provided in the switch unit, but in this embodiment, a horn switch 15 shaped in the form of a pad is disposed to the upper portion of the pad body 11, which is positioned above the lower portion 13 and opposite thereto. The switch unit 140 and the horn switch are electrically connected to the microcomputer 12.

A numeral 17 designates a cover member by which the aforesaid steering shaft 5 and a part of the steering gear are covered, and a numeral 18 designates a switch lever for controlling a wiper and front lamps. The switch lever is disposed in the cover member so as to project from the cover member.

Under the above-mentioned construction, when a driver rotates the steering wheel 1, the spoke 2, the core bar 3, the coller member and the steering shaft 5 are rotated together with the steering wheel so that the pinions 9, 9' and 10, 10' move around the stationary ring gear 6 with each of them rotating on its axis. On the other hand, since the other ring gear 6' is rotatably supported on the steering shaft 5, the aforesaid ring gear 6' maintains a stationary state relative to the rotation of the steering shaft 5. Namely, the ring gear 6' is observed not to rotate and to continue in the non-rotational state.

As a result, the pad body 11, the control microcomputer 12 and each control switch 14, which are fixed to the aforesaid ring gear 6', continue to be in a stationary state, respectively.

Figure 3:
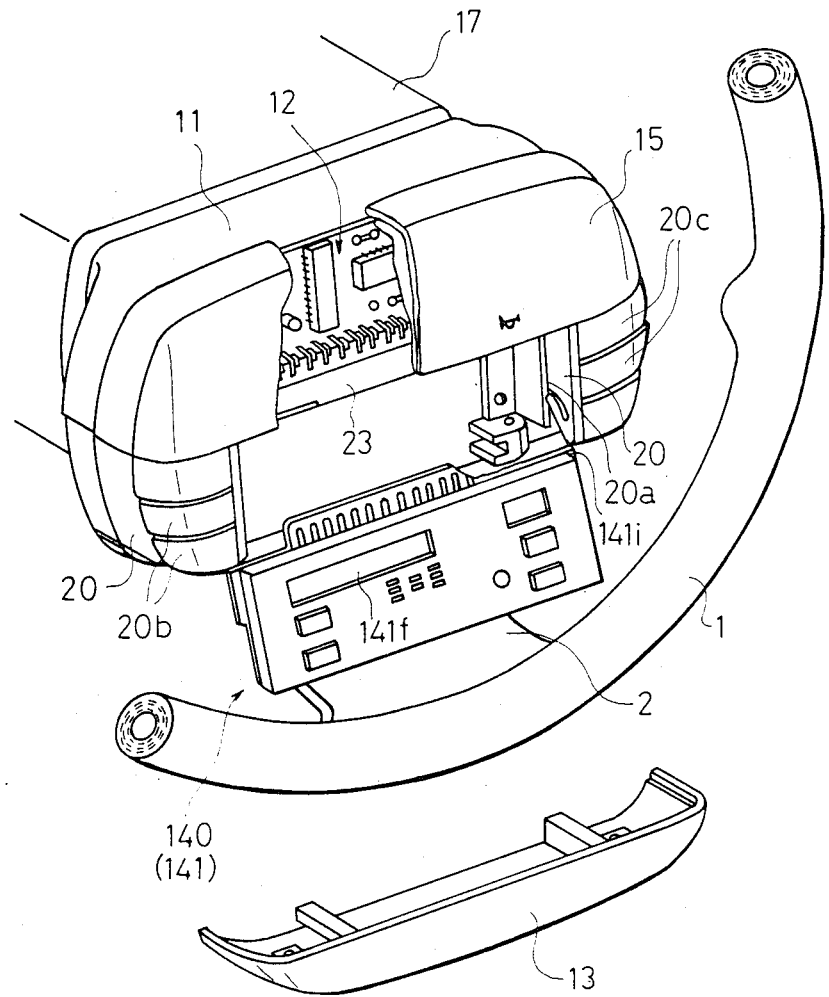
FIG. 3 is a perspective view of the steering wheel assembly S of FIG. 1 taken in the direction of arrow III of FIG. 1.

On the other hand, each electric appliances 22, for example, a horn, air-conditioner, car radio, automatic drive equipment or the like, is electrically connected to a second microcomputer 20 in a signal receiving side through an interface 21. The second microcomputer 20 in signal receiving side is also connected to the first microcomputer 12 in a signal transmitting side via the cables 6C, 6D and 6C'. The control microcomputer 12 is further connected to a connecting plug 23 disposed to the pad body 11 (as shown in FIG. 3).

Consquently, each electric appliances 22 is electrically connected to one of the connecting terminals (not shown) of the connecting plug 23, with the corresponding relation of one to one to each other.

Both microcomputers 12 and 20 encode signals to be applied to each of the electric appliances 22 as described above thereby to reduce the number of signal lines required for the cable 19. These signals can be encoded and then also decoded by means of both microcomputers 12 and 20, respectively.

In this embodiment, each of the control switches 14 shown in FIG. 1 is formed into a cassette as the switch unit 140. The switch unit 140 has a plug with a plurallity of terminals. The plug is connected to the socket 23.

Figure 2A:
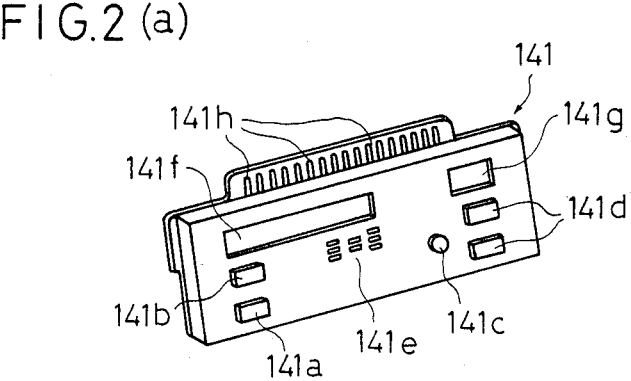
FIG. 2(a) is a perspective view illustrating a cassette switch unit 140 shown in FIG. 1.
Figure 2B:
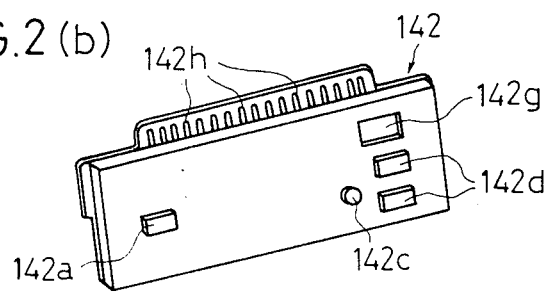
FIG. 2(b) is a perspective view of another cassette switch.

As the aforesaid switch unit 140, several kinds of units are prepared and a plurality of switches different from each other are mounted to each of the prepared switch units. For example, a cassette type switch unit 141 shown in FIG. 2(a) is provided with a car radio switch 141a, a radio communication switch 141b to be mounted to an automobile, air-conditioner switch 141c and temperature control switch 141d and it is also provided with a microphone 141e and displays 141f, 141g therein as attachments thereof. Each of the switch units 141, 142 has seventeen terminals as shown in FIGS. 2(a) and 2(b). The seventeen terminals may be sufficient for the necessary associated switches. However, in this example of FIG. 2(a), four of the illustrated terminals are used in practice.

FIG. 2(b) illustrates another cassette type of switch unit 142. In this case, there is disposed a car radio switch 142a, air-conditioner switch 142c and temperature control switch 142d in the switch unit 142 and as an attachment thereof, there is only disposed one display 142g therein. In this example of FIG. 2(b), three of the terminals 142h are in use in practice.

In case where the unit 141, for example, is mounted to the pad body 11 as the cassette type switch unit 140, the lower part 13 is detached as shown in FIG. 3 and under this state, an engagement projection 141i of the unit 141 is engaged with an engagement grooves 20a of a supporting member 20 fixed to the pad body 11.

In FIG. 3, numerals 20b and 20c designate standard control switches, respectively, and for exmaple, a headlight switch, window-washer switch or the like is mounted.

Figure 4A:
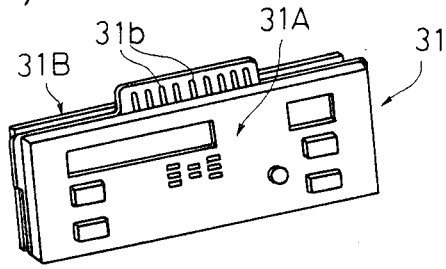
FIG. 4(a) is a perspective view of a cassette 31 wherein the switch unit 140 and a control microcomputer 12 in a signal transmitting side are combined in one body.
Figure 4B:
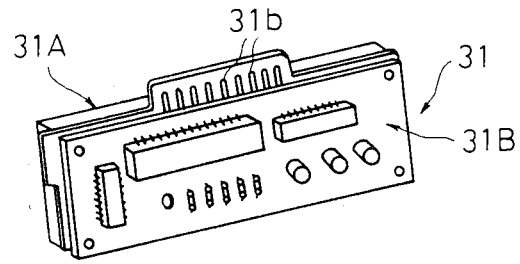
FIG. 4(b) is a perspective rear side view of the cassette shown in FIG. 4(a).

In the aforesaid embodiment, only each of the switches 14 is constructed as a cassette type switch unit, however, the switches 14 and the microcomputer 12 in a signal transmitting side may be combined together to be constructed as a cassette unit, for example, as shown in FIG. 4(a) and FIG. 4(b).

In FIG. 4(a) and FIG. 4(b), a cassette 31 includes a switch unit 31A and a microcomputer 31B in a signal transmitting side, and in the switch unit 31A, there are disposed a variety of switches in the same manner as in FIG. 2(a). The cassette 31 also has a plug with terminals 31b to be connected to the cable 19 (shown in FIG. 1). In this example of FIGS. 4(a) and 4(b), the number of terminals 31b illustrated therein are less than those in the cases of FIGS. 2(a) and 2(b). The reason is as follows. Namely, in the cases of FIGS. 2(a) and 2(b), there is taken all kinds of switches which can be expected to be necessary to take into consideration and the corresponding number of terminals to all of the switches are provided taking also mass production of the cassettes into consideration. On the other hand, in the terminals 31*b* shown in FIGS. 4(*a*) and 4(*b*), the control signal is encoded by means of the microcomputer 12 in a signal transmitting side and then is decoded by means of the microcomputer 20 in a signal receiving side. Therefore, in this case, it is not necessary for the number of terminals 31*b* to correspond to the number of control devices.

Obviously, numerous modifications and variations of the present invention are possible in light of the above teachings. It is therefore to be understood that within the scope of the appended claims, the invention may be practiced otherwise than as specifically described herein.

What is claimed is:

1. A steering wheel assembly with a control system, comprising:
    a steering wheel;
    a center pad;
    a spoke conducting said steering wheel and said center pad; and
    a connecting plug positioned in said center pad wherein said center pad further comprises means formed therein selectively and interchangeably receiving one of a plurality of terminal components for connection with said connecting plug, said terminal component comprising at least one manual input switch means and at least one output means corresponding to a plurality of electrical appliances and used in controlling said electrical appliances.

2. A steering wheel assembly according to claim 1, wherein said center pad is provided with one side of an electrical connector and one side of a mechanical connector and wherein said terminal component is provided with an opposite side of said electrical connector and an opposite side of said mechanical connector.

3. A steering wheel assembly according to claim 2, wherein said terminal component further comprises a switch unit which includes at least first and second switches.

4. A steering wheel assembly according to claim 2, wherein said terminal component further comprises signal output means.

5. A steering wheel assembly according to claim 2, wherein said terminal component further comprises a cassette member.

6. A steering wheel assembly according to claim 1, further comprising a computer positioned in said center pad for controlling operation of said terminal component.

7. A steering wheel assembly according to claim 6, wherein said terminal component and said computer are assembled in a single cassette member.

8. A steering wheel assembly with a control system, comprising:
    a steering wheel;
    a center pad;
    a spoke connecting said steering wheel and said center pad; and
    a connecting plug positioned in said center pad wherein said center pad further comprises means formed therein selectively and interchangeably receiving one of a plurality of terminal components for connection with said connecting plug, said terminal component comprising at least two manual input switching means corresponding to a plurality of electrical appliances and used in controlling said electrical appliances.

9. A steering wheel assembly with a control system, comprising:
    a steering wheel;
    a center pad;
    a spoke connecting said steering wheel and said center pad; and
    a connecting plug positioned in said center pad wherein said center pad further comprises means formed therein selectively and interchangeably receiving one end of a plurality of terminal components for connection with said connecting plug, said terminal component comprising a plurality of output means corresponding to a plurality of electrical appliances and used in controlling said electrical appliances.

* * * * *